United States Patent [19]

Bertolucci et al.

[11] 4,348,491

[45] Sep. 7, 1982

[54] HEAT STABLE MOLDED PHENOLIC RESIN ARTICLE

[75] Inventors: Michael D. Bertolucci; John R. Bartolomucci, both of Pittsfield, Mass.

[73] Assignee: General Electric Company, Pittsfield, Mass.

[21] Appl. No.: 309,376

[22] Filed: Oct. 7, 1981

Related U.S. Application Data

[63] Continuation-in-part of Ser. No. 123,406, Feb. 21, 1980, abandoned.

[51] Int. Cl.³ ............................................. C08L 61/10
[52] U.S. Cl. ................................. 523/214; 524/456; 524/511
[58] Field of Search .............. 524/511, 456, 841, 566; 523/214; 525/139

[56] References Cited

U.S. PATENT DOCUMENTS

| | | | |
|---|---|---|---|
| 2,540,592 | 2/1951 | Newberg et al. | 525/139 |
| 2,598,289 | 5/1952 | Newman | 525/139 |
| 2,657,185 | 10/1953 | Young et al. | 525/139 |
| 2,935,763 | 5/1960 | Newman et al. | 525/139 |
| 3,015,568 | 1/1962 | McLain | 525/139 |
| 3,344,094 | 9/1967 | de Gauge | 260/38 |
| 3,474,065 | 10/1969 | Gburek et al. | 525/139 |
| 3,586,735 | 6/1971 | Giller et al. | 525/139 |
| 3,702,841 | 11/1972 | Sawko | 525/139 |
| 4,183,841 | 1/1980 | Danowski | 525/139 |

*Primary Examiner*—Lewis T. Jacobs
*Attorney, Agent, or Firm*—William F. Mufatti

[57] ABSTRACT

A heat stable molded phenolic resin article comprising, in percent by weight, from about 20 to about 70 percent of an oil unmodified phenolic resin, from about 3 to about 25 percent of an acrylonitrile-butadiene elastomer, and from about 15 to about 70 percent of a silicate mineral. Also a molding composition comprising, in percent by weight, from about 20 to about 70 percent of an oil unmodified phenol-aldehyde thermosettable resin, from about 3 to about 25 percent of an acrylonitrile-butadiene elastomer, and from about 15 to about 70 weight percent of a silicate mineral.

18 Claims, No Drawings

HEAT STABLE MOLDED PHENOLIC RESIN ARTICLE

This application is a continuation-in-part of copending application Ser. No. 123,406 filed Feb. 21, 1980, now abandoned.

This application relates to thermoset plastic articles and to thermosetting plastic compositions. More particularly, it relates to molded thermoset articles containing a oil unmodified phenol-aldehyde resin, an acrylonitrile-butadiene fiber or particulate form.

BACKGROUND OF THE INVENTION

Phenolic-aldehyde resins are generally highly brittle low impact strength materials of limited compatibility with other plastics. Plasticizers have been employed with these materials to increase the flexibility thereof, but increased flexibility has resulted in the diminution of other properties and processing difficulties. For example, to obtain any significant degree of flexibility relatively large amounts, often equalling or exceeding the amount of phenol-aldehyde resin, of glycols or glycerine must be used. These large amounts of glycols or glycerine diminish the product strength and induce sweating out of the glycol or glycerine during the heat curing cycle. Furthermore, plasticization by crosslinking with unsaturated polymers such as polyvinylbutyral or other compatible elastomers has not been wholly satisfactory because of the lowered heat and solvent resistance of the resulting products. These products, while possessing improved impact strength, still lack suitable flexibility. Likewise, the use of unsaturated oils such as tung oil as resin modifiers, even in substantial amounts, fails to provide sufficient flexibility to the phenol-aldehyde resin product.

The inclusion of finely divided fillers such as wood flour and walnut shell flour in these products adversely affects their heat resistance and dimensional stability and does little to improve impact strength. When the molded phenol-aldehyde product contains long fibered cellulosic fillers such as paper flock, cotton flock, or sisal fiber it exhibits adequate impact strength but remains deficient in heat resistance and dimensional stability. The use of these long fibered cellulosic fillers also adversely affects the surface qualities of the molded product, thereby rendering it unsatisfactory for many applications.

The prior art has attempted to remedy some of these aforediscussed drawbacks by utilizing phenol-aldehyde articles comprised of oil modified phenol-aldehyde resins, such as cashew nut shell oil modified phenol-aldehyde resins; a copolymer of butadiene-acrylonitrile; and certain silicate fillers such as diatomaceous earth. However, these articles are still unsatisfactory as they exhibit relatively low heat resistance and significantly reduced rigidity which results in a lowered heat distortion temperature. This poor heat resistance and lowered heat distortion temperature is due to the utilization of an oil modified, such as cashew nut shell oil modified, phenol-aldehyde resin and the resultant lowered crosslink density of the resin matrix in the molded article.

There thus exists a need for a molded product made from a phenol-aldehyde resin which has good impact strength, good high temperature rigidity, high heat resistance, good dimensional stability, good surface appearance, high flexural modulus, and good heat stability, i.e., the ability to retain its properties upon exposure to heat. The present invention provides such a phenolic-aldehyde molded article and a molding composition for producing such an article.

DESCRIPTION OF THE INVENTION

The present invention is based on the discovery that a phenolic molded article containing a phenolic resin which is not modified by an oil such as a cashew nut shell oil, a butadiene-acrylonitrile copolymer, and a silicate mineral, either in fiber or particulate form, possesses good impact strength, good heat resistance, good dimensional stability, good hot rigidity as exemplified by the heat distortion temperature, high flexural modulus, good surface appearance, and good heat stability.

Thus, one embodiment of this invention is a phenolic resin molded article containing a non oil modified phenolic resin, an acrylonitrile-butadiene elastomer, and a silicate mineral. Another embodiment of the present invention is a phenolic molding composition containing a non oil modified, such as a non cashew nut shell oil modified, thermosetting phenolic resin, a butadiene-acrylonitrile copolymer, an a silicate mineral.

The molded article of the present invention comprises from about 20 to about 70 percent by weight of a non oil modified, such as a non cashew nut shell oil modified, phenolic resin. The phenolic resin, which is not modified by an oil such as cashew nut shell oil, may be a one- or two-stage phenolic resin. The two stage phenolic resins, the non oil modified novolak resins, are well known and may, in general, be the condensation product of at least one phenol and an amount of one aldehyde insufficient to cause complete crosslinking, or cure, and in which an acid or basic catalyst may be utilized to promote the reaction. The phenols useful in producing these resins are those represented by the general formula

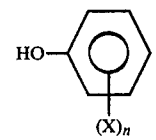

I.

wherein n has a value from 0 to 2 inclusive. In Formula I each X is independently selected from the group consisting of hydroxyl radicals; lower alkyl radicals, preferably those containing from 1 to about 4 carbon atoms;

radicals wherein s has a value from 0 to 2 inclusive, and each A is independently selected from hydroxyl radicals and lower alkyl radicals, preferably those containing from 1 to about 4 carbon atoms; and

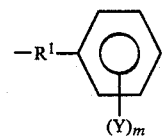

radicals wherein m has a value from 0 to 2 inclusive, $R^1$ is a lower alkylene radical, preferably one containing from 1 to about 4 carbon atoms, or a lower alkylidene radical, preferably containing from 1 to about 4 carbon atoms, and each Y is independently selected from hydroxyl radicals and lower alkyl radicals, preferably those containing from 1 to about 4 carbon atoms.

In the phenols represented by Formula I when more than one X substituent is present, they may be the same or different. The same is true for the A and Y substituents.

Some nonlimiting illustrative examples of phenols represented by Formula I include phenol itself, the cresols, the xylenols, the hydroxydiphenyls, the dihydroxydiphenyls, the bis-(hydroxyphenyl)alkanes such as 2,2-bis(4-hydroxyphenyl)propane, 2,2-bis(3-methyl-4-hydroxyphenyl)methane, and the like.

It is, of course, possible to utilize a mixture of two or more phenols of Formula I in preparing the novolak resins useful in the instant invention.

The preferred phenols, for the purposes of the instant compositions, are those phenols of Formula I wherein each X is independently selected from hydroxyl radicals and lower alkyl radicals. Alternately, mixtures comprised of major amounts of these preferred phenols and minor amounts of the other phenols defined by Formula I may also be employed.

The aldehyde utilized in the instant invention is an aldehyde such as formaldehyde, acetaldehyde, furfural, and the like. Formaldehyde is preferred for the purposes of the instant compositions.

The thermosettable resin produced by this reaction is mixed with an amount of curing agent, such as hexamethylenetetramine, effective to cause the mixture to harden and cure to an infusible, insoluble state when subjected to heat or to heat and pressure. Such a resin might, for example, be the reaction product of phenol and formaldehyde in the ratio of 0.85 mole of formaldehyde per mole of phenol, with sulfuric acid as the catalyst. The thermosettable resin so produced may then be mixed with hexamethylenetetramine, for example, in the ratio of 16 parts by weight of hexamethylenetetramine per 100 parts by weight of the novolak resin, to produce the final resin capable of being completely cured under heat or heat and pressure.

Typical of the two-stage phenolic resins suitable for use in the present invention are those prepared by placing one mole of phenol into a reactor with 1% by weight concentrated sulfuric acid and heating to a temperature of 97°–100° C. While maintaining the temperature, 0.75 mole of formaldehyde as a 37% aqueous solution is slowly added over a period of 30–60 minutes. Using heat and vacuum, the reaction product then is dehydrated until a temperature of 120°–130° C. is reached at 27–28 inches of vacuum. The resin product is then cooled and ground with 14–18 parts by weight of hexamethylenetetramine per 100 parts by weight of resin with the resulting ground mixture being typical of the two-stage phenolic molding resin useful in the composition of the instant invention.

The one-stage oil, such as cashew nut shell oil, unmodified phenolic resins, the oil unmodified resole resins, are well known and may in general be the condensation product of at least one phenol represented by Formula I and an amount of a single aldehyde, such as formaldehyde, acetaldehyde, furfural, and the like, which is sufficient to cause crosslinking or cure when subjected to heat or heat and pressure. An alkaline catalyst may be used to promote the reaction. The product of this reaction is thermosetting without the addition of hardening or curing agents. Formaldehyde is the preferred aldehyde utilized in producing the resole resins, which are not modified by an oil such as cashew nut shell oil, useful in the instant invention. An illustrative example of the production of a one-stage phenolic resin which is not modified with an oil is the reaction of phenol with formaldehyde in the ratio of 1.5 moles of formaldehyde per mothose prepared by reacting one mole of phenol with a solution of formaldehyde in the presence of a 0.5–2 percent by weight, based on the amount of phenol present, of a hydroxide catalyst (sodium, calcium, barium, etc.) to yield a ratio of 1.0 to 1.3 moles of formaldehyde to one mole of phenol. The reaction is carried out by heating slowly (30–60 minutes) to a temperature of 70°–100° C. and holding at that temperature for another 30–60 minutes to carry out the condensation step. The resin product is recovered by dehydrating while heating under vacuum and then cooling.

The oil unmodified phenolic resin component is present in the molded article in amounts generally ranging from about 20 to about 70 weight percent, preferably from about 25 to about 55 weight percent, more preferably from about 30 to about 50 weight percent, and most preferably from about 35 to about 45 weight percent.

The acrylonitrile-butadiene elastomers which are used as essential constituents of the molded articles are well known and are generally the copolymerization products of acrylonitrile and butadiene polymers. Preferred acrylonitrile-butadiene copolymers are those obtained from butadiene and acrylonitrile monomers wherein the weight ration of butadiene monomers to acrylonitrile monomers is in the range of from about 95:5 to about 15:85. Generally, the acrylonitrile-butadiene constituent is present in the molded article and in the molding composition in from about 3 to about 25 percent by weight, preferably from about 4 to about 20 percent by weight, more preferably from about 5 to about 15 percent by weight, and most preferably from about 8 to about 12 percent by weight.

The silicate minerals which are utilized as an essential constituent of the instant compositions and molded articles generally include the naturally occurring silicate minerals such as mica, talc, clay and the like. Preferred silicate minerals are selected from glasses, both glass fibers and particulate glass, the alkali and alkaline earth metal silicates, aluminum silicate, and mixtures thereof. Illustrative of the alkali and alkaline earth metal silicates are sodium silicate, potassium silicate, magnesium silicate, calcium silicate, and lithium silicate. The more preferred silicate minerals are those selected from glasses, the alkali and alkaline earth metal silicates, aluminum silicate and mixtures thereof in conjunction with coupling agents selected from silanes and titanates. These more preferred silicate minerals generally contain a minor amount, i.e., from about 0.5 to about 2 percent by weight, of the coupling agent and a major amount, i.e., from about 98 to about 99.5 percent by weight, of the silicate.

One particularly useful silicate mineral constituent contains a mixture of glass and calcium silicate in a weight ratio of 1:1. Another particularly useful silicate mineral constituent contains calcium silicate containing a silane coof a mixture of two or more silicate minerals.

Generally, the silicate mineral constituent is present in the molding composition and in the molded article in from about 15 to about 70 percent by weight, preferably from about 20 to about 65 percent by weight, more preferably from about 30 to about 60 percent by weight, and most preferably from about 40 to to about 50 percent by weight.

The molding compositions and the molded articles of the instant invention may also optionally contain other materials such as dyes, pigments, fillers, lubricants, antioxidants, mold release agents, flame retardants, and the like, all of which additives are well known in the art and are commonly used in the preparation of phenolic resin compositions and articles.

In the practice of the instant invention the acrylonitrile-butadiene copolymer and the silicate mineral are added to the phenol-aldehyde resin prepolymer prior to the compounding of the resin into a molding composition. Generally, in the case wherein the novolak resin is used as the resin component of the molded article, the phenol and the aldehyde are first reacted in the presence of heat and a catalyst to form a prepolymer; the prepolymer is ground and a suitable curing agent, such as hexamethylenetetramine, is added thereto; the mixture of the curing agent and prepolymer is further ground to powder form; the powdered mixture of prepolymer and curing agent is then mechanically mixed, in an extruder or roll system, with the acrylonitrile-butadiene copolymer and silicate mineral to form the molding composition; and this molding composition is fed into a molding apparatus wherein, by the application of heat, the prepolymer is cured to the phenol novolak resin. Another method of making the novolak resin containing molded article comprises using a liquid phenol-aldehyde prepolymer. In this process, the liquid prepolymer obtained by reacting the phenol and aldehyde in the presence of a catalyst and heat is blended with a curing agent, with the silicate mineral, and with the acrylonitrile-butadiene copolymer in an extruder or roll system to form the molding composition; and the molding composition is fed to a molding apparatus wherein the prepolymer is cured, by the application of heat, to the phenol novolak resin.

Generally, in the case wherein the resole resin is used as the phenolic resin component of the molded article, the phenol and aldehyde are partially reacted in the presence of heat and a catalyst to form a prepolymer. The prepolymer is then ground to powder form; the powdered prepolymer is then mechanically mixed, in an extruder or roll system, with the silicate mineral and the acrylonitrile-butadiene copolymer to form a molding composition; and this molding composition is then molded in a molding apparatus wherein the prepolymer is cured, through the application of heat, i.e., further condensed and crosslinked, to form the phenol resole resin.

It is understood, however, that the method of preparing the composition of this invention is not critical and can vary depending on the desired method to be employed or the form of the composition herein claimed.

When the term prepolymer is used herein, it is meant to include the further curable, i.e., further crosslinkable or thermosettable, partial condensation product of a phenol and an aldehyde. In the case of the resole prepolymer, curing or thermosetting occurs by further application of heat to the partial condensation product of a phenol and an aldehyde. In the case of a novolak prepolymer, further curing or thermosetting occurs by heating the partial condensation product of a phenol and aldehyde in the presence of a curing agent such as hexamethylenetetramine.

Thus, another embodiment of the present invention comprises a molding composition comprising a prepolymer of a phenolic resin, specifically a prepolymer of an oil unmodified novolak or oil unmodified resole resin, an acrylonitrile-butadiene copolymer, and a silicate mineral. The phenolic resin prepolymer component is present in the molding composition in amounts generally ranging, in percent by weight, from about 20 to about 70 percent, preferably from about 25 to about 55 percent, more preferably from about 30 to about 50 percent, and most preferably from about 35 to about 45 percent. The acrylonitrile-butadiene copolymer component of the molding composition is generally present, in percent by weight, from about 3 to about 25 percent, preferably from about 4 to about 20 percent, more preferably from about 5 to about 15 percent, and most preferably from about 8 to about 12 percent. The silicate mineral component of the molding composition is generally present, in percent by weight, in from about 15 to about 70 percent, preferably from about 20 to about 65 percent, more preferably from about 30 to about 60 percent, and most preferably from about 40 to about 50 percent. The molding compositions are molded into various shapes and articles using conventional molds, molding conditions and techniques of operation.

PREFERRED EMBODIMENT OF THE INVENTION

In order to more fully and clearly illustrate the present invention, the following examples are presented. It is intended that the examples be considered as illustrative rather than limiting the invention disclosed and claimed herein. In the examples all parts and percentages are on a weight basis unless otherwise specified.

EXAMPLE 1

This example illustrates a molded article outside the scope of the instant invention molded from a molding composition containing a typical oil unmodified two-stage phenolic thermosetting molding resin and silicate minerals but not containing the acrylonitrile-butadiene copolymer. The formulation employed was as follows:

| Component | Percent by Weight |
| --- | --- |
| Resin | 40 |
| Silicate Minerals (a 1:1 weight ratio of glass to silane modified calcium silicate) | 56.5 |
| Lubricants | 1.5 |
| Colorants | 2.0 |

The above ingredients were comixed on a conventional roll-mill system and molded into test samples using a pressure of about 1,000 psi and a temperature of about 165° C. for about one minute.

EXAMPLE 2

This example illustrates a molded article outside the scope of the instant invention molded from a molding composition containing a typical non oil modified two-stage phenolic thermosetting molding resin and acrylonitrile-butadine copolymer but not containing the silicate mineral. The formulation employed was as follows:

| Component | Percent by Weight |
|---|---|
| Resin | 40 |
| Acrylonitrile-butadiene copolymer | 10 |
| Cellulosic Filler | 46.5 |
| Lubricants | 1.5 |
| Colorants | 2.0 |

The above ingredients were comixed on a conventional roll-mill system and molded into test samples using a pressure of about 1,000 psi and a temperature of about 165° C. for about one minute.

EXAMPLE 3

This example illustrates a molded article outside the scope of the instant invention molded from a molding composition containing a typical oil unmodified two-stage phenolic thermosetting molding resin and silicate minerals but containing Elvaloy (an ethylene vinyl acetate copolymer sold by E. I. DuPont de Nemours and Company) in place of the acrylonitrile-butadiene copolymer. The formulation employed was as follows:

| Component | Percent by Weight |
|---|---|
| Resin | 40 |
| Elvaloy (ethylene vinyl acetate) | 10 |
| Silicate Minerals (a 1:1 weight ratio of glass to silane modified calcium silicate) | 46.5 |
| Lubricants | 1.5 |
| Colorants | 2.0 |

The above ingredients were comixed on a conventional roll-mill system and molded into test samples using a pressure of about 1,000 psi and a temperature of about 165° C., for about 1 minute.

EXAMPLE 4

This example illustrates a molded article outside the scope of the instant invention molded from a molding composition containing a typical cashew nut shell oil modified two-stage phenolic resin, silicate minerals, and acrylonitrile-butadiene copolymer. The formulation employed was as follows:

| Component | Percent by Weight |
|---|---|
| Cashew nut shell oil modified two-stage phenolic resin (Varcum 9820) | 40 |
| Acrylonitrile-butadiene copolymer | 10 |
| Silicate Minerals (a 1:1 weight ratio of glass to silane modified calcium silicate) | 46.5 |
| Lubricants | 1.5 |
| Colorants | 2.0 |

The above ingredients were comixed on a conventional roll-mill system and molded into test samples using a pressure of about 1,000 psi and a temperature of about 165° C. for one minute.

EXAMPLE 5

This example illustrates a molded article of the present invention molded from a molding composition containing a typical oil unmodified two-stage phenolic thermosetting molding resin (a phenol-formaldehyde resin), acrylonitrile-butadiene copolymer, and the silicate minerals. The formulation employed was as follows:

| Component | Percent by Weight |
|---|---|
| Resin | 40 |
| Acrylonitrile-butadiene copolymer | 10 |
| Silicate Minerals (a 1:1 weight ratio of glass to silane modified calcium silicate) | 46.5 |
| Lubricants | 1.5 |
| Colorants | 2.0 |

The above ingredients were comixed on a conventional roll-mill system and molded into test samples using a pressure of about 1,000 psi and a temperature of about 165° C. for one minute.

The properties of the molded products of Example 1–5 were compared and the comparative results are set forth in Table I.

Several test specimens comprising a 4 inch diameter by ⅛ inch thick disc were subjected to a Drop Ball Impact Test. In this test, the disc was placed in a dropped ball impact tester and the center of the disc was struck with a ½-pound weight. The weight was dropped repeatedly from a height sequentially raised in 1-inch increments and the point at which the specimen shattered was recorded.

Several test specimens one-half inch wide and one-half inch thick were subjected to the Izod impact test. The Izod impact test was performed in accordance with the ASTM standards D 256-A. Briefly, the specimen is notched and placed in a holder and a fixed pendulum swings down and breaks the sample. The value of the energy expended in breaking the specimen, expressed in ft. lbs/in. of notch, is recorded.

Several test specimens comprising a transfer molded ½" ×½"×5" bars were subjected to the Bar Impact Test. In this test, the bar was placed in a fixture supporting the bars at their ends and the center of the bar was struck with a ½ pound Gardner-type dart. The dart was raised in 2 inch increments after each strike and the point at which the specimen cracked was recorded.

Several test specimens ¼"×½"×5" were tested for flexural strength, both before and after heat aging, according to ASTM standard D-790.

The results of these tests are set forth in Table I.

TABLE I

| TEST | EXAMPLE NO. | | | | |
|---|---|---|---|---|---|
| | 1 | 2 | 3 | 4 | 5 |
| Drop Ball Impact (½ lb. wt.) | | | | | |
| As Molded | 15" | 8" | 24" | 15" | 25" |
| 5 Hrs. at 350° F. Post Baked | 12" | 9" | 26" | 17" | 24" |
| Bar Impact (½ lb. wt.) | | | | | |
| As Molded | 18.9" | — | — | — | 29.6" |
| 5 Hrs. at 350° F. Post Baked | 15.2" | — | — | — | 37.7" |
| Notched Izod (ft. lb./in.) | | | | | |

TABLE I-continued

| TEST | EXAMPLE NO. | | | | |
|---|---|---|---|---|---|
| | 1 | 2 | 3 | 4 | 5 |
| As Molded | 0.45 | 0.38 | 0.52 | 0.36 | 0.60 |
| 5 Hrs. at 350° F. Post Baked | 0.40 | 0.48 | 0.53 | 0.38 | 0.60 |
| Unnotched Izod (ft. lb./in.) as molded | 1.7 | 1.7 | 2.1 | 1.1 | 2.7 |
| Heat Distortion Temperature °F. at 264 psi | 410 | 348 | 363 | 286 | 550+ |
| Flexural Strength (psi) | | | | | |
| As Molded | 15,200 | 8,000 | 10,900 | 9,400 | 12,200 |
| 5 Hrs. at 350° F. Post Baked | 17,700 | 9,500 | 11,000 | 11,800 | 15,300 |
| 5 Hrs. at 350° F. & 48 Hrs. at 450° F. Post Baked | 16,530 | 6,000 | 9,100 | 12,300 | 17,850 |

As can be seen from the data in Table I, oil unmodified phenolic resin molded articles containing both the acrylonitrile-butadiene copolymer and the silicate mineral exhibit an increase in impact strength, heat distortion temperature, and flexural strength after exposure to heat, over those oil unmodified phenolic resin molded articles which do not contain the combination of both the acrylonitrile-butadiene copolymer and the silicate mineral.

It can be seen from Table I that while the flexural strength of an oil unmodified phenolic resin molded article of the instant invention, i.e., one containing both the acrylonitrile-butadiene copolymer and the silicate mineral, continues to increase after exposure to heat (Example No. 5), the flexural strengths of the prior art phenolic molded articles, i.e., articles of Examples 1-3, tend to first increase after mild heating but then decrease after exposure to more severe heating conditions. Thus, while the initial flexural strength of the molded article of Example 1, which contains the silicate mineral but not the acrylonitrile-butadiene copolymer, is greater than the initial flexural strength of the molded article of Example 5, which contains both the acrylonitrile-butadiene copolymer and the silicate mineral, the flexural strength of the article of Example 5 continually increases upon exposure to heat until after being heated for 5 hours at 350° F. and for an additional 48 hours at 450° F., it is greater than both the initial and identically heat aged flexural strengths of the article of Example 1.

Table I clearly illustrates the criticality of the presence of both the acrylonitrile-butadiene copolymer and the silicate mineral in obtaining an oil unmodiffurther seen from Table I that while the flexural strength retention of the oil modified phenolic resin molded article of Example 4 is similar to that of the instant invention of Example 5, the unique combination of improved heat resistance, improved impact strength and high temperature rigidity or Heat Distortion Temperature exhibited by the molded article of the instant invention is not present in the article of Example 4. Moreover, the Heat Distortion Temperature of molded articles from oil modified resin systems such as that of Example 4 is significantly reduced in comparison to both the oil unmodified articles such as in Examples 4 and 5.

Although the above examples have shown one embodiment of the present invention, variations thereof are possible in light of the above teachings. It is, therefore, to be understood that changes may be made in the particular embodiments of the invention described which are within the full intended scope of the invention as defined by the appended claims.

What is claimed is:

1. A molded article exhibiting improved thermal stability consisting essentially of, in percent by weight, of:
   (i) from about 20 to about 70 percent of an oil unmodified phenolic resin;
   (ii) from about 3 to about 25 percent of an acrylonitrile-butadiene copolymer; and
   (iii) from about 15 to about 70 percent of at least one silicate mineral.

2. The article of claim 1 wherein said oil unmodified phenolic resin is an oil unmodified novolak resin.

3. The article of claim 1 wherein said oil unmodified novolak resin is the condensation product of at least one oil unmodified phenol and a aldehyde.

4. The article of claim 3 wherein said aldehyde is formaldehyde.

5. The article of claim 1 wherein said oil unmodified phenolic resin is an oil unmodified resole resin.

6. The article of claim 5 wherein said oil unmodified resole resin is the condensation product of at least one oil unmodified phenol and an aldehyde.

7. The article of claim 1 wherein said silicate mineral is selected from glasses, the alkali and alkaline earth metal silicates, aluminum silicate, and mixtures thereof.

8. The article of claim 1 wherein said silicate mineral is selected from silane or titanate modified glasses, the alkali and alkaline earth metal silicates, aluminum silicate and mixtures thereof.

9. The article of claim 1 wherein said article contains lubricants and colorants.

10. A molding composition exhibiting improved thermal stability consisting essentially of, in percent by weight, of:
    (i) from about 20 to about 70 percent of a thermosettable oil unmodified phenol-aldehyde resin;
    (ii) from about 3 to about 25 percent of an acrylonitrile-butadiene copolymer; and
    (iii) from about 15 to about 70 percent of at least one silicate mineral.

11. The composition of claim 10 wherein said oil unmodified phenol-aldehyde resin is a thermosettable oil unmodified novolak resin.

12. The composition of claim 11 wherein said oil unmodified novolak resin is the condensation product of at least one oil unmodified phenol and an aldehyde.

13. The composition of claim 12 wherein said aldehyde is formaldehyde.

14. The composition of claim 10 wherein said oil unmodified phenol-aldehyde resin is a thermosettable oil unmodified resole resin.

15. The composition of claim 14 wherein said oil unmodified resole resin is the condensation product of at least one oil unmodified phenol and an aldehyde.

16. The composition of claim 15 wherein said aldehyde is formaldehyde.

17. The composition of claim 10 wherein said silicate mineral is selected from glasses, alkali and alkaline earth metal silicates, aluminum silicate, and mixtures thereof.

18. The composition of claim 10 wherein said silicate mineral is selected from silane or titanate modified glasses, alkali and alkaline earth metal silicates, aluminum silicate, and mixtures thereof.

* * * * *